(12) United States Patent
Zhang

(10) Patent No.: US 9,201,268 B2
(45) Date of Patent: Dec. 1, 2015

(54) LIQUID-CRYSTAL-LENS TYPE LIGHT-MODULATING APPARATUS AND LIQUID CRYSTAL DISPLAY HAVING THE SAME

(71) Applicant: BOE TECHNOLOGY GROUP CO., LTD., Beijing (CN)

(72) Inventor: Zhuo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 13/704,124
(22) PCT Filed: Oct. 19, 2012
(86) PCT No.: PCT/CN2012/083234
  § 371 (c)(1),
  (2) Date: Dec. 13, 2012
(87) PCT Pub. No.: WO2013/086896
  PCT Pub. Date: Jun. 20, 2013

(65) Prior Publication Data
  US 2014/0055716 A1   Feb. 27, 2014

(30) Foreign Application Priority Data
  Dec. 14, 2011   (CN) .......................... 2011 1 0418464

(51) Int. Cl.
  *G02F 1/13*   (2006.01)
  *G02F 1/1335*   (2006.01)
  *G02F 1/29*   (2006.01)
(52) U.S. Cl.
  CPC .... *G02F 1/133611* (2013.01); *G02F 1/133512* (2013.01); *G02F 1/133526* (2013.01);
  (Continued)
(58) Field of Classification Search
  CPC .................. G02F 1/133611; G02F 1/133606; G02F 1/133512; G02F 1/133526; G02F 1/29; G02F 2203/28; G02F 2203/48; G02B 27/2214; G02B 27/0093; G02B 27/22; G02B 27/2228; H04N 3/0409; H04N 13/0404
  USPC ........................................... 349/15, 110, 200
  See application file for complete search history.

(56) References Cited

U.S. PATENT DOCUMENTS 5,299,041 A * 3/1994 Morin et al. .................... 349/42
5,796,451 A * 8/1998 Kim ................................ 349/66

(Continued)

OTHER PUBLICATIONS

Birendra Bahadur, Liquid Crystals Applications and Uses, 1990, World Scientific, vol. 1, pp. 171-194.*

(Continued)

*Primary Examiner* — Edward Glick
*Assistant Examiner* — David Chung
(74) *Attorney, Agent, or Firm* — Ladas & Parry LLP

(57) ABSTRACT

A liquid-crystal-lens type light-modulating apparatus and a liquid crystal display having the same are disclosed. The liquid-crystal-lens type light-modulating apparatus comprises: a first light-transmissive substrate, with a first electrode layer and a first alignment layer being provided sequentially on an upper surface thereof; a second light-transmissive substrate located over the first substrate, with a second electrode layer and a second alignment layer being provided sequentially on a lower surface thereof; and liquid crystal sandwiched between the first and second alignment layers, wherein at least one from the first and second electrode layers is formed as a patterned electrode, and the patterned electrode comprises: a plurality of electrode light-transmissive regions and a plurality of light-shielding regions, arranged at an interval therebetween; and the liquid-crystal-lens type light-modulating apparatus further comprises a shielding sheet provided above the second substrate, and the shielding sheet comprises: a plurality of shielding sheet light-transmissive regions and a plurality of shielding sheet light-shielding regions, arranged at an interval therebetween; and each of the shielding sheet light-shielding regions is located over one of the electrode regions in the patterned electrode, and has an area less than the area of an electrode region corresponding to it.

20 Claims, 1 Drawing Sheet

(52) U.S. Cl.
CPC .... *G02F1/133606* (2013.01); *G02F 2001/294* (2013.01); *G02F 2203/28* (2013.01); *G02F 2203/48* (2013.01)

(56) References Cited

U.S. PATENT DOCUMENTS

| | | | | |
|---|---|---|---|---|
| 6,246,451 | B1* | 6/2001 | Matsumura et al. | 349/15 |
| 6,392,690 | B1* | 5/2002 | Fujii et al. | 348/59 |
| 6,750,932 | B2* | 6/2004 | Kim | 349/114 |
| 2009/0153754 | A1* | 6/2009 | Jung | 349/15 |
| 2011/0051239 | A1* | 3/2011 | Daiku | 359/464 |
| 2011/0102690 | A1* | 5/2011 | Kikuchi et al. | 349/15 |
| 2012/0287359 | A1* | 11/2012 | Yamazaki et al. | 349/15 |
| 2013/0002970 | A1* | 1/2013 | Baek et al. | 349/5 |

OTHER PUBLICATIONS

First Chinese Office Action dated Sep. 11, 2013; Appln. No. 201110418464.0.

International Preliminary Report on Patentability dated Jun. 17, 2014; PCT/CN2012/083234.

\* cited by examiner

LIQUID-CRYSTAL-LENS TYPE LIGHT-MODULATING APPARATUS AND LIQUID CRYSTAL DISPLAY HAVING THE SAME

TECHNICAL FIELD

The present invention relates to a liquid-crystal-lens type light-modulating apparatus and a liquid crystal display having the same.

BACKGROUND

Liquid crystal displays have a very important specification, that is, brightness, and a most important factor used to determine brightness is aperture ratio. Simply to say, aperture ratio is a proportion of an effective light-transmissive region through which light can pass. When light is emitted from a backlight, not all the light can pass through a panel, due to for example signal lines used for a source-driver chip and a gate-driver chip of an LCD, thin film transistors (TFTs), and storage capacitors used for storage of voltages. These portions are not fully light-transmissive; in addition, they can not display correct grayscales, because light passing through these portions is not under control of a voltage; therefore, they all should be covered with a black matrix, so as to avoid interference with the proper brightness in other light-transmissive regions. After excluding of the above-mentioned opaque regions, a ratio of the remaining effective light-transmissive regions to the whole area is referred to as aperture ratio.

In a liquid crystal display of the prior art, when light is emitted from a backlight, the light will pass through a polarizer sheet, glass, liquid crystal, color filter, and so on, sequentially. Assuming that the light transmittance of various components is as follows: polarizer sheet, 50% (because it only allows polarized light in a single direction to pass through); glass, 95% (two pieces of glass—the upper and the lower glass—which both are required to calculate); liquid crystal, 95%; aperture ratio, 50% (effective light-transmissive regions only occupy a half area); color filter, 27% (assuming that a material by itself has a light-transmittance of 80%, since the color filter itself is colored, it only allows light wave of that color to pass through; with RGB primary colors as an example, a color filter only allows one of the three colors to pass through, and therefore only one third of the brightness is remained; thus, the light transmittance in total is 80%*33%=27%). In calculating with the light-transmittance parameters described above, only 6% of the light emitted from the backlight will remain; and consequently, in order to obtain sufficient brightness for a liquid crystal display, it is necessary to increase the brightness of the backlight, which will increase displaying costs accordingly.

SUMMARY

In order to at least partially solve the above-mentioned technical problem, embodiments of the present invention provide a liquid-crystal-lens type light-modulating apparatus and a liquid crystal display having the same.

A liquid-crystal-lens type light-modulating apparatus according to an embodiment of the present invention, comprises:

a first light-transmissive substrate, with a first electrode layer and a first alignment layer being provided sequentially on an upper surface of the first substrate;

a second light-transmissive substrate located over the first substrate, with a second electrode layer and a second alignment layer being provided sequentially on a lower surface of the second substrate; and liquid crystal sandwiched between the first alignment layer and the second alignment layer, wherein at least one of the first electrode layer and the second electrode layer is formed as a patterned electrode, and the patterned electrode comprises: a plurality of electrode light-transmissive regions and a plurality of light-shielding regions, arranged at an interval therebetween; and the liquid-crystal-lens type light-modulating apparatus further comprises a shielding sheet provided above the second substrate, and the shielding sheet comprises: a plurality of shielding sheet light-transmissive regions and a plurality of shielding sheet light-shielding regions, arranged at an interval therebetween; and each of the shielding sheet light-shielding regions is located over one of the electrode regions in the patterned electrode, and has an area less than the area of an electrode region corresponding to it.

The patterned electrode may be connected with an electrode-voltage control circuit, for controlling the voltage on each of the electrode regions in the patterned electrode correspondingly.

According to some examples, the first electrode layer is a planar electrode, and the second electrode layer is the patterned electrode; and the first electrode layer is connected with an electrode-voltage control circuit, for controlling the voltage on the first electrode layer.

According to some other examples, the first electrode layer is the patterned electrode, and the second electrode layer is a planar electrode; and the second electrode layer is connected with an electrode-voltage control circuit, for controlling the voltage on the second electrode layer.

According to some other examples, both the first electrode layer and the second electrode layer are patterned electrodes, and each of the electrode regions in the second electrode layer is located over one of the electrode regions in the first electrode layer correspondingly.

Preferably, the shielding sheet is located outside a single time of the minimum focal-length of the liquid-crystal-lenses. More preferably, the shielding sheet is located outside double times of the minimum focal-length of the liquid-crystal-lenses.

The electrode regions in the patterned electrode may be in a circular shape or a polygonal shape.

The first substrate and the second substrate are assembled and sealed with sealant to form a cell.

A liquid crystal display according to an embodiment of the present invention, comprises: a backlight, and a liquid-crystal-lens type light-modulating apparatus provided above the backlight, wherein the liquid-crystal-lens type light-modulating apparatus has a configuration as described above.

Preferably, the liquid crystal display further comprises a color filter, and the color filter comprises, a plurality of color pixel units; each of the color pixel units comprises: a red filter grid, a green filter grid and a blue filter grid, each grid corresponding to one liquid crystal lens respectively.

Preferably, a diffusing sheet is provided on an upper surface of the shielding sheet or above the shielding sheet; and, the first electrode is a patterned electrode, with a reflective layer being provided on one side of the light-shielding regions thereof facing the backlight.

Figure 1:
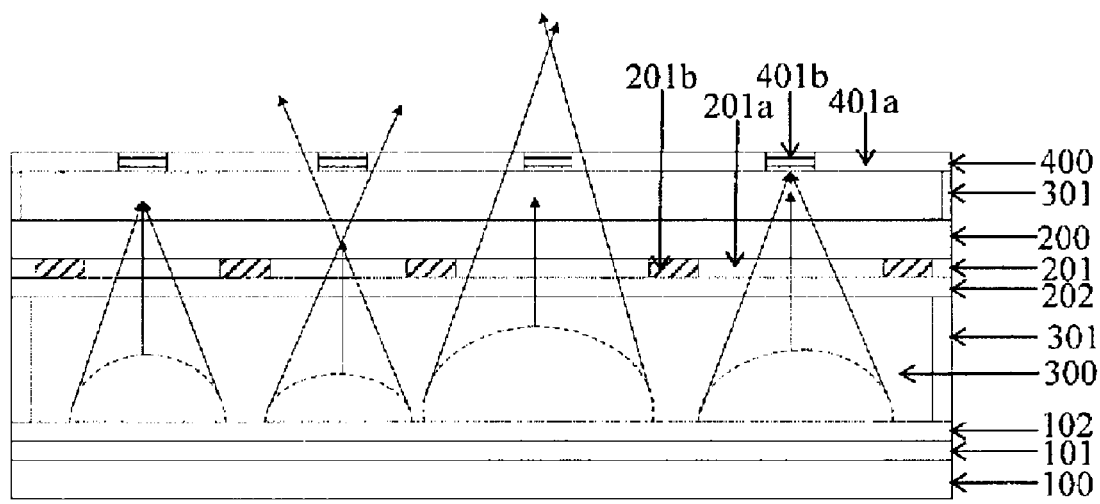
FIG. 1 is a schematic structural view of a liquid-crystal-lens type light-modulating apparatus according to a first embodiment of the present invention.

Reference Numerals: 100: First substrate; 101: First electrode layer; 102: First alignment layer; 200: Second substrate; 201: Second electrode layer; 201a: Second electrode region; 201b: Second electrode light-shielding region; 202: Second alignment layer; 300: Liquid crystal layer; 301: Sealant; 400: Shielding sheet; 401a: Shielding sheet light-transmissive region; 401b: Shielding sheet light-shielding region; 500: Backlight; 600: Diffusing sheet; 700: Color filter.

DETAILED DESCRIPTION

Below, in connection with the accompanying drawings and embodiments, specific implementations of the present invention will be described further in detail. The following embodiments are used for explanation of the invention, but not intended to limit the scope of the invention.

First Embodiment

FIG. 1 shows a schematic structural view of a liquid-crystal-lens type light-modulating apparatus according to this embodiment of the invention. The light-modulating apparatus comprises a first substrate 100 and a second substrate 200, and the two substrates are provided opposite to each other and spaced apart at a certain distance; the first substrate 100 is located below the second substrate 200, and liquid crystal, such as a liquid crystal layer 300 as shown in FIG. 1, is added between the two substrates; the two substrates are assembled and sealed with sealant to form a liquid crystal cell.

On an upper surface of the first substrate 100, there is further formed with a first electrode layer 101 and a first alignment layer 102 sequentially; the first alignment layer 102 is in direct contact with the liquid crystal layer 300, and the first alignment layer 102 is used to align the liquid crystal molecules in the liquid crystal layer 300, so that the liquid crystal molecules are arranged regularly in accordance with a certain rule before they are controlled to rotate by a voltage. On a lower surface of the second substrate 200, there is also formed with a second electrode layer 201 and a second alignment layer 202 sequentially; the second alignment layer 202 is in direct contact with the liquid crystal layer 300, and the second alignment layer 202 is used to align the liquid crystal molecules in the liquid crystal layer 300, and cooperates with the first alignment layer 102 to control the regular arrangement of the liquid crystal molecules. The first electrode layer 101 and the second electrode layer 201 cooperate to supply a voltage to the liquid crystal molecules in the liquid crystal layer 300, so as to control the rotational directions and angles of the liquid crystal molecules.

With the above-described liquid crystal cell which has control electrodes and alignment layer structures, the alignment layers brings the liquid crystal molecules into different alignment at different positions as well as different voltages are applied in the positions, so that the liquid crystal cell is allowed to form a plurality of liquid-crystal-lens, that is, the liquid crystal cell can have a lens-function, which makes light through the liquid crystal cell converged.

In order to make the above-described liquid crystal cell have a light-modulating function, in this embodiment, the second electrode layer 201 is provided as a patterned electrode; specifically, the second electrode layer 201 comprises a plurality of second electrode regions 201a and a plurality of second electrode light-shielding regions 201b, arranged at an interval therebetween; the second electrode regions 201a are formed from a light-transmissive material, and also the first substrate 100 and the second substrate 200 are formed from a light-transmissive material. In this embodiment, the first electrode layer 101 is a planar electrode, and the first electrode layer 101 is connected with an electrode-voltage control circuit, adapted to control the voltage on the first electrode layer 101; the second electrode layer 201 is connected with an electrode-voltage control circuit, adapted to control the voltage on each of the second electrode regions 201a in the patterned electrode respectively; a second electrode region 201a, with the corresponding first electrode layer 101 below, forms one liquid-crystal-lens, so that light converged upon passing through that liquid-crystal-lens can be transmitted out from the second electrode regions 201a at the top of that liquid-crystal-lens. There is also provided a shielding sheet 400 above the second substrate 200. The shielding sheet 400 is patterned; specifically, it comprises shielding sheet light-transmissive regions 401a and shielding sheet light-shielding regions 401b. Each of the shielding sheet light-shielding regions 401b is located over one of the second electrode regions 201a in the second electrode layer 201, and has an area less than the area of the second electrode region 201a corresponding to it.

In the plurality of liquid-crystal-lens, by adjusting and controlling voltages on the first electrode layer 101 and on the second electrode regions 201a, various focal-lengths can be formed; the shielding sheet 400 is located outside a single time of the minimum focal-length of the liquid-crystal-lenses, that is, the shielding sheet 400 is located outside the focus of the minimum focal-length of the liquid-crystal-lenses. Preferably, the shielding sheet 400 is located outside double times of the minimum focal-length of the liquid-crystal-lenses. The shielding sheet 400, with the light-shielding regions 401b provided thereon, is able to block light transmitted from at least part of the liquid-crystal-lenses. When the focus of a certain liquid-crystal-lens is exactly on the shielding sheet light-shielding regions 401b, then light will be absorbed and can not pass therethrough; when the focal-length of a certain liquid-crystal-lens is greater than or less than the distance from the shielding sheet 400 to the center of that liquid-crystal-lens, then part of light can pass therethrough, while part of light is blocked by the shielding sheet light-shielding regions 401b. Thus, by modulating the focal-lengths of the liquid-crystal-lenses, the light intensity will be modulated.

In order to improve the light-modulating effect of the shielding sheet 400, in this embodiment, with respect to an area of a conventional liquid-crystal-lens, the area of the second electrode regions 201a is provided to be not larger than 1.1 times the area of the liquid-crystal-lens, preferably not larger than the area of the liquid-crystal-lens, more preferably not larger than 0.8 times the area of the liquid-crystal-lens. In this embodiment, the second electrode regions 201a may be in a circular, rectangular or other polygonal shape or the like shape.

The liquid-crystal-lens light-modulating apparatus in this embodiment, after being provided with a patterned shielding sheet, by controlling the voltages applied to the first electrode layer 101 and to the second electrode layer 201, can easily modulate the focal-length of each liquid-crystal-lens, and therefore the light transmittance is modulated; the light-modulating apparatus can also be used in applications such as detection and reception of optical signals, since it does not change the polarization state of light and thus can be well used in optical communications.

Second Embodiment

The liquid-crystal-lens type light-modulating apparatus provided by this embodiment has a similar structure to the first embodiment, with the difference that, in this embodiment, the first electrode layer 101 is a patterned electrode and the second electrode layer 201 is a planar electrode. The patterned structure of the first electrode layer 101 is similar to the structure of the second electrode layer 101 in the first embodiment, and the first electrode layer 101 has the same relative positional relationship with the shielding sheet 400 as in the first embodiment. Specifically, the first electrode layer 101 comprises: a plurality of first electrode regions and first electrode light-shielding regions, arranged at an interval therebetween; the first electrode layer 101 is connected with an electrode-voltage control circuit, adapted to control the voltage on each of the first electrode regions in the patterned electrode; and each of the shielding sheet light-shielding regions 401b is located over one of the first electrode regions in the first electrode layer 101, and that shielding sheet light-shielding region 401b has an area less than the area of the first electrode region corresponding to it.

Third Embodiment

The liquid-crystal-lens type light-modulating apparatus provided by this embodiment has a similar structure to the first embodiment, with the difference that both the first electrode layer 101 and the second electrode layer 201 in this embodiment are patterned electrodes. Specifically, the first electrode layer 101 comprises: a plurality of first electrode regions and first electrode light-shielding regions, arranged at an interval therebetween; the first electrode layer 101 is connected with an electrode-voltage control circuit, adapted to control the voltage on each of the first electrode regions in the patterned electrode. Moreover, each of the electrode regions in the second electrode layer 201 is located over one of the electrode regions in the first electrode layer 101; and the structure of the shielding sheet 400 and its relative positional relationship with the second electrode layer 201 are kept unchanged, the same as those in the first embodiment.

Fourth Embodiment

Figure 2:
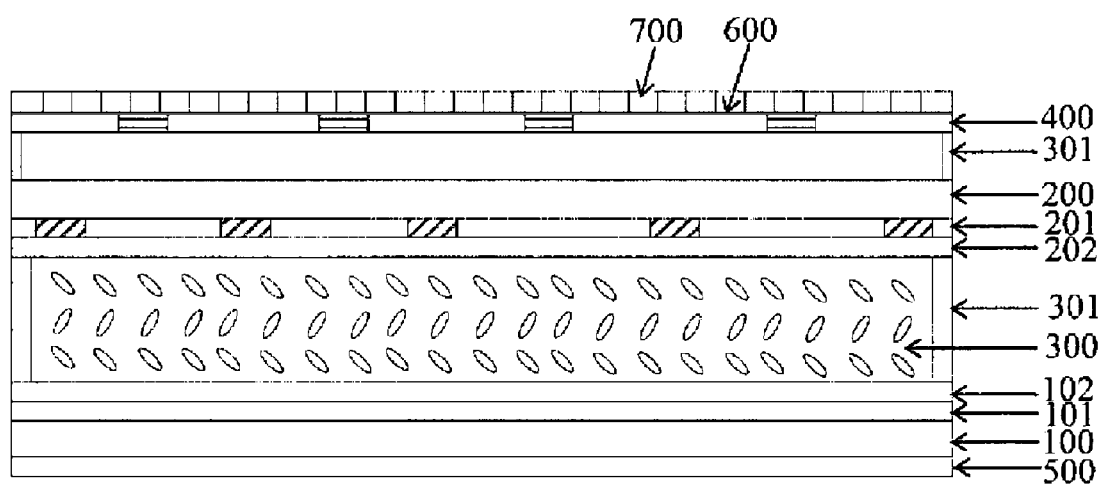
FIG. 2 is a schematic structural view of a liquid crystal display according a fourth embodiment of the present invention.

FIG. 2 shows a schematic structural view of a liquid crystal display of the present embodiment, and the liquid crystal display is manufactured based on the light-modulating apparatus of the first embodiment. In order to achieve image display, a backlight 500 is provided on back side of the liquid crystal cell, that is, below the first substrate 100. In order to improve the utilization of the backlight 500 in the display, a reflective layer can be provided between a light guide plate and a backlight plate of the backlight 500, as well as provided at one side of the light-shielding regions in the first electrode layer 101 facing the backlight. In order to achieve a wide-viewing-angle display, a diffusing sheet 600 can be provided on an upper surface of the shielding sheet 400 or above the shielding sheet 400. In order to achieve color display, a color filter 700 can be provided above the second electrode layer 201 or above the shielding sheet 400. Specifically, according to other requirements of display, corresponding improvements in structures or functions can be made to the display.

The liquid crystal display of this embodiment omits a polarizer sheet and accordingly overcomes the defects of non-high aperture ratio and low light-transmittance which are brought by a polarizer sheet; and by modulating the voltage between the two electrodes, the light-transmittance for the light emitted from the backlight can be modulated, thus the utilization of the backlight can be improved.

As can be seen from the above embodiments, the present invention utilizes the liquid-crystal-lens technology to make light passing through liquid-crystal-lenses focused at different positions, and by providing a shielding sheet outside the minimum focal-length of the liquid-crystal-lenses, makes part of the light passing through the liquid-crystal-lenses able to be absorbed. Thus, it is only necessary to control the voltage between the electrodes to obtain a suitable focal-length of a lens so that the light intensity bypassing the shielding sheet can be modulated. Because the apparatus has no polarizer sheet, most of the light from the backlight can be transmitted through the shielding sheet through the lenses; therefore, the backlight utilization is much higher than that in a traditional LCD. In addition, the light-modulating apparatus can be used in a display, provided that a uniform planar backlight is added on the back side. In order to improve the utilization of a backlight in the display, in the case that the first electrode layer of the liquid-crystal-lenses is a patterned electrode, a reflecting layer can be provided at one side of the light-shielding regions of the patterned electrode facing the backlight. In order to achieve a wide viewing angle, a diffusion structure or a diffusing sheet can be provided on an upper surface of the shielding sheet or above the shielding sheet. To achieve color display, a color filter can be provided above the second electrode layer or above the shielding sheet. The light-modulating apparatus can also be used in applications such as detection and reception of optical signals, since it does not change the polarization state of light and thus can be well used in optical communications.

The above description is merely the preferred implementations of the present invention. It should be noted that, for the ordinary skilled in the art, improvements and replacements can be made without departing from the principles of the invention, also these improvements and replacements should be regarded as within the scope of the invention.

The invention claimed is:

1. A liquid-crystal-lens type light-modulating apparatus, comprising:
    a first light-transmissive substrate, with a first electrode layer and a first alignment layer being provided sequentially on an upper surface of the first substrate;
    a second light-transmissive substrate located over the first substrate, with a second electrode layer and a second alignment layer being provided sequentially on a lower surface of the second substrate;
    an electrode-voltage control circuit connected to at east one of the first electrode layer and the second electrode layer; and
    liquid crystal sandwiched between the first alignment layer and the second alignment layer,
    wherein at least one of the first electrode layer and the second electrode layer is formed as a patterned electrode, and the patterned electrode comprises: a plurality of light-transmissive electrode regions and a plurality of light-shielding regions, arranged at an interval therebetween, and the light-transmissive electrode regions correspond to liquid-crystal-lenses; and
    the liquid-crystal-lens type light-modulating apparatus further comprises a shielding sheet provided above the second substrate and on a light exiting side of the liquid-crystal-lens type light-modulating apparatus, and the shielding sheet comprises: a plurality of shielding sheet light-transmissive regions and a plurality of shielding sheet light-shielding regions, arranged at an interval therebetween; each of the shielding sheet light-shielding regions is located over one of the electrode regions in the patterned electrode, and has an area less than an area of the one of electrode regions corresponding to it; and a projection of each of the shielding sheet light-shielding regions on the second substrate, along a direction vertical to the second substrate, is between two adjacent light-shielding regions of the patterned electrode, which two adjacent light-shielding regions defining corresponding one of light-transmissive electrode regions of the patterned electrode;

the electrode-voltage control circuit is provided to control voltages applied to the at least one of the first electrode layer and the second electrode layer and thus the liquid-crystal-lenses have different focal-lengths to modulate light intensities bypassing the shielding sheet emitting out from the liquid-crystal-lenses.

2. The liquid-crystal-lens type light-modulating apparatus according to claim 1, wherein the patterned electrode is connected with the electrode-voltage control circuit, adapted to control the voltage on each of the electrode regions in the patterned electrode correspondingly.

3. The liquid-crystal-lens type light-modulating apparatus according to claim 1, wherein the first electrode layer is a planar electrode, and the second electrode layer is the patterned electrode; and the first electrode layer is connected with the electrode-voltage control circuit, adapted to control the voltage on the first electrode layer.

4. The liquid-crystal-lens type light-modulating apparatus according to claim 1, wherein the first electrode layer is the patterned electrode, and the second electrode layer is a planar electrode; and the second electrode layer is connected with the electrode-voltage control circuit, adapted to control the voltage on the second electrode layer.

5. The liquid-crystal-lens type light-modulating apparatus according to claim 1, wherein both the first electrode layer and the second electrode layer are patterned electrodes, and each of the electrode regions in the second electrode layer is located over one of the electrode regions in the first electrode layer correspondingly.

6. The liquid-crystal-lens type light-modulating apparatus according to claim 1, wherein the shielding sheet is located outside a single time of the minimum focal-length of the liquid-crystal-lenses.

7. The liquid-crystal-lens type light-modulating apparatus according to claim 5, wherein the shielding sheet is located outside double times of the minimum focal-length of the liquid-crystal-lenses.

8. The liquid-crystal-lens type light-modulating apparatus according to claim 1, wherein the electrode regions in the patterned electrode are in a circular shape or a polygonal shape.

9. The liquid-crystal-lens type light-modulating apparatus according to claim 1, wherein the first substrate and the second substrate are assembled and sealed with sealant to form a cell.

10. A liquid crystal display, comprising:
a backlight; and
a liquid-crystal-lens type light-modulating apparatus provided above the backlight, the apparatus comprising:
a first light-transmissive substrate, with a first electrode layer and a first alignment layer being provided sequentially on an upper surface of the first substrate;
a second light-transmissive substrate located over the first substrate, with a second electrode layer and a second alignment layer being provided sequentially on a lower surface of the second substrate;
an electrode-voltage control circuit connected to at least one of the first electrode layer and the second electrode layer; and
liquid crystal sandwiched between the first alignment layer and the second alignment layer, wherein at least one of the first electrode layer and the second electrode layer is formed as a patterned electrode, and the patterned electrode comprises: a plurality of light-transmissive electrode regions and a plurality of light-shielding regions, arranged at an interval therebetween, and the light-transmissive electrode regions correspond to liquid-crystal-lenses; and the liquid-crystal-lens type light-modulating apparatus further comprises a shielding sheet provided above the second substrate and on a light exiting side of the liquid-crystal-lens type light-modulating apparatus, and the shielding sheet comprises: a plurality of shielding sheet light-transmissive regions and a plurality of shielding sheet light-shielding regions, arranged at an interval therebetween; and each of the shielding sheet light-shielding regions is located over one of the electrode regions in the patterned electrode, and has an area less than an area of the one of the electrode regions corresponding to it; and a projection of each of the shielding sheet light-shielding regions on the second substrate, along a direction vertical to the second substrate, is between two adjacent light-shielding regions of the patterned electrode, which two adjacent light-shielding regions defining corresponding one of light-transmissive electrode regions of the patterned electrode;

the electrode-voltage control circuit is provided to control voltages applied to the at least one of the first electrode layer and the second electrode layer and thus the liquid-crystal-lenses have different focal-lengths to modulate light intensities bypassing the shielding sheet emitting out from the liquid-crystal-lenses.

11. The liquid-crystal-lens type light-modulating apparatus according to claim 10, wherein the patterned electrode is connected with the electrode-voltage control circuit, adapted to control the voltage on each of the electrode regions in the patterned electrode correspondingly.

12. The liquid-crystal-lens type light-modulating apparatus according to claim 10, wherein the first electrode layer is a planar electrode, and the second electrode layer is the patterned electrode; and the first electrode layer is connected with the electrode-voltage control circuit, adapted to control the voltage on the first electrode layer.

13. The liquid-crystal-lens type light-modulating apparatus according to claim 10, wherein the first electrode layer is the patterned electrode, and the second electrode layer is a planar electrode; and the second electrode layer is connected with the electrode-voltage control circuit, adapted to control the voltage on the second electrode layer.

14. The liquid-crystal-lens type light-modulating apparatus according to claim 10, wherein both the first electrode layer and the second electrode layer are patterned electrodes, and each of the electrode regions in the second electrode layer is located over one of the electrode regions in the first electrode layer correspondingly.

15. The liquid-crystal-lens type light-modulating apparatus according to claim 10, wherein the shielding sheet is located outside a single time of the minimum focal-length of the liquid-crystal-lenses.

16. The liquid-crystal-lens type light-modulating apparatus according to claim 15, wherein the shielding sheet is located outside double times of the minimum focal-length of the liquid-crystal-lenses.

17. The liquid-crystal-lens type light-modulating apparatus according to claim 10, wherein the electrode regions in the patterned electrode are in a circular shape or a polygonal shape.

18. The liquid-crystal-lens type light-modulating apparatus according to claim 10, wherein the first substrate and the second substrate are assembled and sealed with sealant to form a cell.

19. The liquid crystal display according to claim 10, further comprising a color filter, and the color filter comprises a plurality of color pixel units; and each of the color pixel units comprises: a red filter grid, a green filter grid and a blue filter grid, each grid corresponding to one liquid crystal lens respectively.

20. The liquid crystal display according to claim 10, wherein a diffusing sheet is provided on an upper surface of the shielding sheet or above the shielding sheet; and the first electrode is the patterned electrode, with a reflective layer being provided on one side of the light-shielding regions thereof facing the backlight.

\* \* \* \* \*